US008143335B2

(12) United States Patent
Rainio

(10) Patent No.: US 8,143,335 B2
(45) Date of Patent: Mar. 27, 2012

(54) ADHESIVE COMPOSITION

(75) Inventor: Jouni Rainio, Puhos (FI)

(73) Assignee: Momentive Specialty Chemicals Inc., Columbus, OH (US)

( * ) Notice: Subject to any disclaimer, the term of this patent is extended or adjusted under 35 U.S.C. 154(b) by 545 days.

(21) Appl. No.: 12/135,813

(22) Filed: Jun. 9, 2008

(65) Prior Publication Data

US 2008/0242753 A1 Oct. 2, 2008

Related U.S. Application Data

(63) Continuation-in-part of application No. 10/549,544, filed as application No. PCT/FI2004/000177 on Mar. 26, 2004, now abandoned.

(30) Foreign Application Priority Data

Mar. 28, 2003 (FI) ..................................... 20030466

(51) Int. Cl.
| | |
|---|---|
| C03C 25/26 | (2006.01) |
| C04B 26/12 | (2006.01) |
| C04B 28/02 | (2006.01) |
| C08F 220/12 | (2006.01) |
| C08G 12/42 | (2006.01) |
| C08G 4/00 | (2006.01) |
| C08G 6/00 | (2006.01) |
| C08G 10/00 | (2006.01) |
| C08G 12/00 | (2006.01) |
| C08G 12/12 | (2006.01) |
| C08G 14/00 | (2006.01) |
| C08G 16/00 | (2006.01) |
| C08G 8/00 | (2006.01) |
| C08G 14/04 | (2006.01) |
| C08G 18/24 | (2006.01) |
| C08G 18/38 | (2006.01) |
| C08G 18/48 | (2006.01) |
| C08G 63/00 | (2006.01) |
| C08G 65/00 | (2006.01) |
| C08J 3/00 | (2006.01) |
| C08J 9/00 | (2006.01) |
| C08K 5/19 | (2006.01) |
| C08K 5/41 | (2006.01) |
| C08K 5/42 | (2006.01) |
| C08L 61/00 | (2006.01) |
| C08L 61/22 | (2006.01) |

(52) U.S. Cl. ........ 524/156; 524/155; 524/157; 524/158; 524/166; 524/593; 524/594; 524/597; 521/55; 521/99; 521/107; 521/114; 521/121; 521/180; 521/181; 521/186; 521/187; 521/188

(58) Field of Classification Search ................... 524/155, 524/156, 157, 158, 166, 593, 594, 597; 521/55, 521/99, 107, 114, 121, 180, 181, 186, 187, 521/188
See application file for complete search history.

(56) References Cited

U.S. PATENT DOCUMENTS

| | | | |
|---|---|---|---|
| 2,323,831 A | 7/1943 | Menger et al. | |
| 2,927,868 A | 3/1960 | Revoir et al. | |
| 3,905,921 A | 9/1975 | Cone et al. | |
| 4,172,067 A | 10/1979 | Benton et al. | |
| 5,324,590 A | 6/1994 | Nylund et al. | |
| 5,556,906 A * | 9/1996 | Collins et al. ................. | 524/463 |
| 5,695,823 A | 12/1997 | Hsu et al. | |

FOREIGN PATENT DOCUMENTS

| | | |
|---|---|---|
| DE | 10 83 461 B | 6/1960 |
| EP | 0 809 686 | 12/1997 |
| GB | 1 108 503 A | 4/1968 |
| JP | 55 125 132 A | 9/1980 |
| JP | 4 185685 A | 7/1992 |
| WO | WO 9831763 A1 | 7/1998 |
| WO | WO 9831764 A1 | 7/1998 |
| WO | WO 9946349 A1 | 9/1999 |
| WO | WO 2004/085521 A1 | 10/2004 |

OTHER PUBLICATIONS

Print out of the web-page: http:/www.lion.co.jp/chem/en/cata_en/s11.htm.
Ash et al., Handbook of Industrial Surfactants, 2nd edition, vol. 1, Gower Publishing Limited, p. 1182 (1997).
Rompps Chemie-Lexikon, 8th Ed., Franckh, Stuttgart, "Tenside", pp. 4153-4157 (1988).
Luukko et al., "Comparing the Use of Different Foaming Agents in Making Phenol-Formaldehyde Plywood Glue", Wood Adhesives, pp. 96-98 (2000).
Luukko et al., "Comparison of Different Foaming Agents in Plywood Glue", Journal of Applied Polymer Science, vol. 93, pp. 1060-1064 (electronically published Apr. 28, 2004).

* cited by examiner

Primary Examiner — Patrick Niland

(57) ABSTRACT

An adhesive composition for use in the manufacture of wood-based boards, wherein the adhesive composition is foamable and comprises a resin, a filler and a foaming agent without any cationic acrylamide copolymer. According to the invention, the adhesive composition contains 40-80 wt % resin, 5-30 wt % filler, 0-40 wt % solvent, and 0.1-10 wt % foaming agent, which has been selected from organic and/or inorganic surface-active sulfate, sulfonate, phosphate or phosphonate compounds or their derivatives or mixtures.

14 Claims, No Drawings

ADHESIVE COMPOSITION

RELATED APPLICATION DATA

This application is a continuation in part of U.S. application Ser. No. 10/549,544 filed Jun. 2, 2006 now abandoned, which claims the benefit of International Application No. PCT/FI2004/000177, with the International filing date of Mar. 26, 2004, claiming priority to the Finland Application No. 20030466, filed Mar. 28, 2003, all of which are hereby incorporated by reference in their entirety.

FIELD OF INVENTION

The present invention relates to an adhesive composition designed for use in the manufacture of wood-based sheets, such as plywood, scaleboard, blackboard, fibreboard, OBS board or equivalent.

BACKGROUND OF THE INVENTION

In the present context, plywood refers to plywood, chipboard or a corresponding multi-layer product formed from at least three veneer layers placed one upon the other or crosswise and glued and pressed against each other to form plywood, chipboard or other equivalent wood based sheets.

In prior art, various adhesives for use in woodboard industry are known. An example of known technology is the use of phenolic resin glues, such as phenol-formaldehyde resin, or urea resin glues as adhesives. Another known technique is to add a foaming agent to an adhesive in order to foam the adhesive composition before its delivery for application in the gluing of woodboard. A preferred known foaming agent used is dried blood. A problem with the use of dried blood are the ethical questions involved. Moreover, when dried blood is used, it may be necessary to add a separate surface tension reducing agent to the adhesive composition in order to achieve the desired properties. A further problem in the use of dried blood is that it is added to the filler or hardener of the adhesive composition in a powdery form, which is why it is difficult to achieve a perfect homogeneity of the composition.

Various other adhesive compositions not containing dried blood as a foaming agent have also been tried in woodboard industry. However, so far, no composition of sufficient quality and efficiency has been found that contains no dried blood and has gluing properties and a price and durability suited for use in the manufacture of wood-based boards.

A further problem in the use of prior-art adhesive compositions is their poor durability, which is why the compositions have to be mixed just before use. In addition, the adhesive concentration in prior-art compositions is conventionally low, and therefore eventual impurities can contaminate the adhesive composition more easily.

The object of the present invention is to overcome the above-mentioned drawbacks concerning an adhesive composition in connection with the manufacture of wood-based boards. A specific object of the invention is to disclose a new, more effective and more ethical adhesive composition.

The adhesive composition of the invention is characterized by what is disclosed in the claims.

SUMMARY OF THE INVENTION

The invention is based off an adhesive composition for use in the manufacture of wood-based boards. The adhesive composition has 40 to 80 wt % of a resin, 5 to 30 wt % of a filler, 0.1 to 10 wt % of a foaming agent and 0 to 40 wt % of a solvent, wherein the adhesive composition is free of a cationic acrylamide copolymer. The foaming agent selected for the adhesive composition is selected from organic surface-active sulfate compounds, inorganic surface-active sulfate compounds, sulfonate compounds, phosphate compounds, phosphonate compounds or mixtures thereof.

In an embodiment the foaming agent is sodium lauryl sulfate.

In an embodiment of the adhesive composition the solvent is present and comprises water or an organic solvent.

In an embodiment of the adhesive composition the resin can be selected from urea-formaldehyde, melamine urea-formaldehyde, melamine urea-formaldehyde phenol, phenol-formaldehyde, phenol melamine formaldehyde, phenol resorcinol formaldehyde and mixtures thereof.

In an embodiment of the adhesive composition the filler can be selected from starch, wheat meal, chalk, sodium carbonate, potassium carbonate, calcium carbonate, ammonium sulfate, wood powder, quebracho and mixtures thereof.

In a preferred embodiment of the adhesive composition the foaming agent comprises 0.1 to 30 wt % and is selected from lauryl sulfate, lauryl ether sulfate, benzene sulfate and mixtures thereof. In this embodiment the filler also contains starch, wheat meal, chalk, sodium carbonate, potassium carbonate, calcium carbonate, ammonium sulfate, wood powder, quebracho and mixtures thereof.

In one embodiment of the invention the adhesive composition contains 40 to 80 wt % of a resin, 5 to 30 wt % of a filler, 0.1 to 10 wt % of a foaming agent and 0 to 40 wt % of a solvent. In this embodiment the foaming agent contains only compounds selected from organic surface-active sulfate compounds, inorganic surface-active sulfate compounds, sulfonate compounds, phosphate compounds, phosphonate compounds and mixtures thereof. In yet a further embodiment the adhesive composition is free of cationic acrylamide copolymers.

In one embodiment of the invention the adhesive composition only contains 40 to 80 wt % of a resin, 5 to 30 wt % of a filler, 0.1 to 10 wt % of a foaming agent and 0 to 40 wt % of a solvent. In this embodiment the foaming agent contains only compounds selected from organic surface-active sulfate compounds, inorganic surface-active sulfate compounds, sulfonate compounds, phosphate compounds, phosphonate compounds and mixtures thereof.

DETAILED DESCRIPTION OF THE INVENTION

The invention is based on an adhesive composition used in the manufacture of wood-based boards. The adhesive composition contains resin, a filler, a foaming agent and a solvent, and it is foamable. According to the invention, the adhesive composition contains 40-80 wt % resin, 5-30 wt % filler, 0-40 wt % solvent and 0.1-10 wt % foaming agent, which has been selected from organic and/or inorganic surface-active sulfate, sulfonate, phosphate or phosphonate compounds or their derivatives or their mixtures.

In an embodiment of the invention, the foaming agent used is lauryl sulfate, lauryl ether sulfate or benzene sulfate or a compound, derivative or mixture of these or the like. In an embodiment, the lauryl sulfate or lauryl ether sulfate has been selected from the group: sodium lauryl sulfate, ammonium lauryl sulfate, potassium lauryl sulfate, sodium lauryl ether sulfate, ammonium lauryl ether sulfate, potassium lauryl ether sulfate, a derivative of these or a mixture of these or the like.

In an embodiment of the invention, the foaming agent used is a substance selected from the group: sodium isopropyl sulfonate, sodium lauryl sulfonate, sodium benzene sulfonate, sodium alkyl benzene sulfonate, ammonium lauryl phosphate, ammonium lauryl sulfonate, potassium olefin sulfate, sodium naphthalene sulfonate or a compound, derivative or mixture of these or the like.

Alternatively, it is possible to use any corresponding surface-active compound as a foaming agent. In this connection, the purpose of the surface-active compound is expressly to promote its foaming.

In a preferred embodiment of the invention, the adhesive composition contains 0.1-5 wt % foaming agent.

In a preferred embodiment, the adhesive composition contains 1-10 wt % foaming agent, of which 0.1-30 wt % is lauryl sulfate, lauryl ether sulfate, benzene sulfate or their compounds, derivatives or mixtures.

In an embodiment of the invention, the resin, i.e. the actual adhesive used may preferably consist of phenol-formaldehyde resins, urea-formaldehyde resins, amino resins or other corresponding resins. In an embodiment, the resin used is UF (urea-formaldehyde resin), MUF (melamine urea-formaldehyde), MUFP, PF (phenol-formaldehyde), PMF or PRF or a derivative or mixture of these or equivalent.

In a preferred embodiment of the invention, the adhesive composition contains 50-70 wt % resin.

In an embodiment of the invention, the adhesive composition contains a filler, preferably in an amount of 8-20 wt %.

In this context, filler refers to a filling agent or hardener known in itself or to a mixture of these. The hardener effects the hardening of the glue in the application, i.e. during the manufacturing of wood-based boards, often preferably together with heat of compression. In an embodiment, the filler used is starch, wheat flower, chalk, sodium carbonate potassium carbonate, calcium carbonate, ammonium sulfate, wood powder, quebracho or a derivative of these or a mixture of these or equivalent. Quebracho means the hard wood material of certain South-American broadleaf trees. Chalk in this connection refers to loose-structured, light and crumbling limestone.

In an embodiment of the invention, the adhesive composition contains a solvent, preferably in an amount of 12-35 wt %. In a preferred embodiment, the solvent is water. The water may be obtained from outside the process or it may be water circulated from within the process, i.e. process wash water. In an alternative embodiment, the solvent is an organic solvent.

In an embodiment of the invention, the adhesive composition contains air, preferably pressurized air, added to it to achieve more effective formation of foam.

In an embodiment, the adhesive composition contains a separate surface-active substance not intended purely for the purpose of foaming, preferably in an amount of 0.1-2 wt %.

In an embodiment, the adhesive composition contains a catalyst.

In a preferred embodiment of the invention, the foaming agent is in solid, liquid or paste-like state. In an embodiment, the foaming agent is added as such or in the form of a solution into the adhesive composition.

In a preferred embodiment, the adhesive composition is an emulsion. In an embodiment of the invention, the adhesive composition has been formed by mixing the resin, filler, foaming agent and solvent together to produce an emulsion, e.g. a water emulsion. In an embodiment, the resin, filler, foaming agent and solvent are mixed at a high temperature, e.g. over 40° C.

In an embodiment, the mixture or emulsion has a high adhesive concentration.

In an embodiment the adhesive mixture is free of cationic acrylamide copolymer. The cationic acrylamide copolymer has a molecular weight of 10,000-300,000 with a pH value between 2 and 4 and can be produced from monomers comprising acrylamide or monomers in a copolymeric cationic form such as a quaternary alkyl-N-alkylamine of acrylamide, a secondary or tertiary alkyl-N-alkylamine of acrylamide or a primary acrylamine, an ester of an acrylic acid, the alcohol moiety of which being a quaternary N-alkylamine alkoxide, or a secondary or tertiary N-alkylamine alkoxide or a primary aminealkoxide.

In an embodiment the foaming agent contains only compounds selected from organic surface-active sulfate compounds, inorganic surface-active sulfate compounds, sulfonate compounds, phosphate compounds, phosphonate compounds and mixtures thereof.

In yet another embodiment the adhesive composition only contains a resin, a filler, a foaming agent and a solvent.

The invention makes it possible to produce a more effective and more ethical adhesive composition. The invention has the advantage that a composition having a very good foamability and allowing a very good control of foamability is achieved.

According to the invention, the adhesive composition contains resin, a foaming agent, a solvent and/or a filler; no separate additives are needed. A further advantage of the invention is that the foaming agent is in liquid phase, allowing a very homogeneous adhesive composition to be produced when the components forming the composition are mixed to form a liquid adhesive mixture.

A further advantage of the invention is that the adhesive has a good and fast spreadability on the surface to be glued. The adhesive is not viscous and it divides easily when being spread. This means a reduced consumption of adhesive.

An additional advantage of the adhesive composition is good durability because adhesive concentration of the composition is substantially higher than in prior-art adhesives and in addition, because the adhesive mixture or emulsion has been preferably formed by mixing the liquid components together and cooking the mixture preferably at a relatively high temperature (over 40° C.). The adhesive composition is preserved substantially unchanged for as long as several weeks. Moreover, the composition is not sensitive to impurities, microbes or equivalent.

The adhesive composition of the invention is applicable for use in the manufacture of various wood-based boards in different conditions.

In the following, the invention will be described with reference to detailed embodiment examples. The weight % in the following examples have been rounded to the nearest significant digit.

Example 1

In an experiment, an adhesive composition was prepared. Phenol formaldehyde resin (52 wt %), filling agent (8.7 wt %), ammonium lauryl sulfate (1.7 wt %) and a solvent (water, 37.3 wt %) were mixed together to form a water mixture. The filling agent was a mixture of calcium carbonate, starch and wheat meal.

The mixture thus produced good foaming characteristics.

Example 2

In an experiment, an adhesive composition as in Example 1 was prepared in a corresponding manner. As an exception to Example 1, the ammonium lauryl sulfate used in this experiment was added directly as a water emulsion. The mixture had a composition corresponding to Example 1. The mixture produced had foaming characteristics substantially as good as those of the mixture in Example 1.

Example 3

In an experiment, phenol formaldehyde resin (50 wt %), filling agent (10 wt %) (as in Example 1), sodium alkyl benzene sulfonate (5.2 wt %) and a solvent (water, 34.8 wt %) were mixed together. The mixture thus produced had a good foamability.

Example 4

In an experiment, an adhesive composition as in Example 3 was prepared. As an exception to Example 3, the foaming agent used in this experiment was a mixture of sodium alkyl benzene sulfonate and ammonium lauryl sulfonate. In this case, the total amount of foaming agents needed to produce a foam could be halved. In the composition of the mixture thus produced, the water content was 37.4 wt % and the foaming agent content was 2.6 wt %.

As a result, a mixture having a good foamability was achieved.

Example 5

In an experiment, an adhesive composition was prepared. Phenol-formaldehyde resin (56.8 wt %), filler (18.5 wt %), ammonium lauryl sulfate (0.5 wt %) and water (24.2 wt %) were mixed together to form a water mixture. The filler was a mixture of starch, chalk, quebracho, potassium carbonate and ammonium sulfate. Alternatively, instead of ammonium lauryl sulfate, it is possible to use sodium lauryl sulfate as a foaming agent.

The mixture thus produced had still better foaming properties and a better stability than the adhesive compositions in examples 1-4.

Example 6

In an experiment, an adhesive composition was prepared. Phenol-formaldehyde resin (65 wt %), filler (11 wt %), sodium lauryl sulfate (0.9 wt %) and water (23 wt %) were mixed together to form a water mixture. The filler was a mixture of starch and wood powder.

The foaming properties and stability of the mixture thus produced were as good as those of the adhesive composition in example 5.

Example 7

In an experiment, an adhesive composition was prepared. Phenol-formaldehyde resin (50 wt %), filler (28 wt %), a mixture (0.7 wt %) of sodium lauryl sulfate, sodium lauryl ether sulfate and water (21.3 wt %) were mixed together to form a water mixture. The filler was a mixture of starch, wheat meal, sodium carbonate and calcium carbonate.

The mixture thus produced had good foaming properties and a good stability.

Example 8

In an experiment, an adhesive composition was prepared. Phenol-formaldehyde resin (67.5 wt %), filler (12.15 wt %), sodium lauryl ether sulfate (0.35 wt %) and water (20 wt %) were mixed together to form a water mixture. The filler was a mixture of starch, wheat meal and wood powder.

The foaming properties and stability of the mixture thus produced were as good as those of the adhesive compositions in examples 5 and 6.

Example 9

In an experiment, an adhesive composition was prepared. Phenol-formaldehyde resin (70 wt %), filler (15 wt %) and a foaming agent mixture (3.0 wt %) containing 21% sodium lauryl sulfate and water (12 wt %) were mixed together to form a water mixture.

The mixture thus produced had good foaming properties.

The adhesive composition of the invention is suited for use as different applications for the manufacture of various wood-based boards.

The embodiments of the invention are not limited to the examples presented above; instead, they may be varied within the scope of the following claims.

I claim:
1. An adhesive composition for use in the manufacture of wood-based boards, the adhesive composition comprising:
    40 to 80 wt % of a resin,
    5 to 30 wt % of a filler,
    0.1 to 10 wt % of a foaming agent comprising a compound selected from the group consisting of organic surface-active sulfate compounds, inorganic surface-active sulfate compounds, sulfonate compounds, phosphate compounds, phosphonate compounds, and combinations thereof, and
    0 to 40 wt % of a solvent,
    wherein the adhesive composition is free of a cationic acrylamide co-polymer and is foamable.
2. The adhesive composition of claim 1 wherein the foaming agent comprises a compound selected from the group consisting of lauryl sulfate, lauryl ether sulfate, benzene sulfate, and combinations thereof.
3. The adhesive composition of claim 2 wherein the foaming agent comprises a compound selected from the group consisting of sodium lauryl sulfate, ammonium lauryl sulfate, potassium lauryl sulfate, sodium lauryl ether sulfate, ammonium lauryl ether sulfate, potassium lauryl ether sulfate, and combinations thereof.
4. The adhesive composition of claim 2 wherein the foaming agent comprises a compound selected from the group consisting of sodium isopropyl sulfonate, sodium lauryl sulfonate, sodium benzene sulfonate, sodium alkyl benzene sulfonate, ammonium lauryl phosphate, ammonium lauryl sulfonate, potassium olein sulfate, sodium naphthalene sulfonate, and combinations thereof.
5. The adhesive composition of claim 1 wherein the foaming agent is sodium lauryl sulfate.
6. The adhesive composition of claim 1 wherein the foaming agent comprises 0.1 to 30 wt % of a compound selected from the group consisting of lauryl sulfate, lauryl ether sulfate, benzene sulfate, and combinations thereof.
7. The adhesive composition of claim 1 wherein the resin comprises a compound selected from the group consisting of urea-formaldehyde, melamine urea-formaldehyde, melamine urea-formaldehyde phenol, phenol-formaldehyde, phenol melamine formaldehyde, phenol resorcinol formaldehyde and combinations thereof.
8. The adhesive composition of claim 1 wherein the filler comprises a compound selected from the group consisting of starch, wheat meal, chalk, sodium carbonate, potassium carbonate, calcium carbonate, ammonium sulfate, wood powder, quebracho, and combinations thereof.

9. The adhesive composition of claim 1 wherein the foaming agent comprises 0.1 to 30 wt % of a compound selected from the group consisting of lauryl sulfate, lauryl ether sulfate, benzene sulfate, and combinations thereof, and
wherein the filler comprises a compound selected from the group consisting of starch, wheat meal, chalk, sodium carbonate, potassium carbonate, calcium carbonate, ammonium sulfate, wood powder, quebracho, and combinations thereof.

10. The adhesive composition of claim 1 wherein the solvent is present and comprises water or an organic solvent.

11. The adhesive composition of claim 1 further comprising added air.

12. The adhesive composition of claim 1 wherein the foaming agent is in solid, liquid or paste-like state.

13. An adhesive composition for use in the manufacture of wood-based boards, the adhesive composition comprising: 40 to 80 wt % of a resin, 5 to 30 wt % of a filler, 0.1 to 10 wt % of a foaming agent and 0 to 40 wt % of a solvent,
wherein the foaming agent consists essentially of a compound selected from the group consisting of organic surface-active sulfate compounds, inorganic surface-active sulfate compounds, sulfonate compounds, phosphate compounds, phosphonate compounds, and combinations thereof, and wherein the adhesive composition is free of a cationic acrylamide co-polymer.

14. An adhesive composition for use in the manufacture of wood-based boards, the adhesive composition consisting essentially of:
40 to 80 wt % of a resin,
5 to 30 wt % of a filler,
0.1 to 10 wt % of a foaming agent selected from the group consisting of organic surface-active sulfate compounds, inorganic surface-active sulfate compounds, sulfonate compounds, phosphate compounds, phosphonate compounds, and combinations thereof, and
0 to 40 wt % of a solvent and wherein the adhesive composition is free of a cationic acrylamide co-polymer.

* * * * *